R. L. BARNETT.
LUBRICATING DEVICE.
APPLICATION FILED SEPT. 16, 1920.
1,424,974. Patented Aug. 8, 1922.
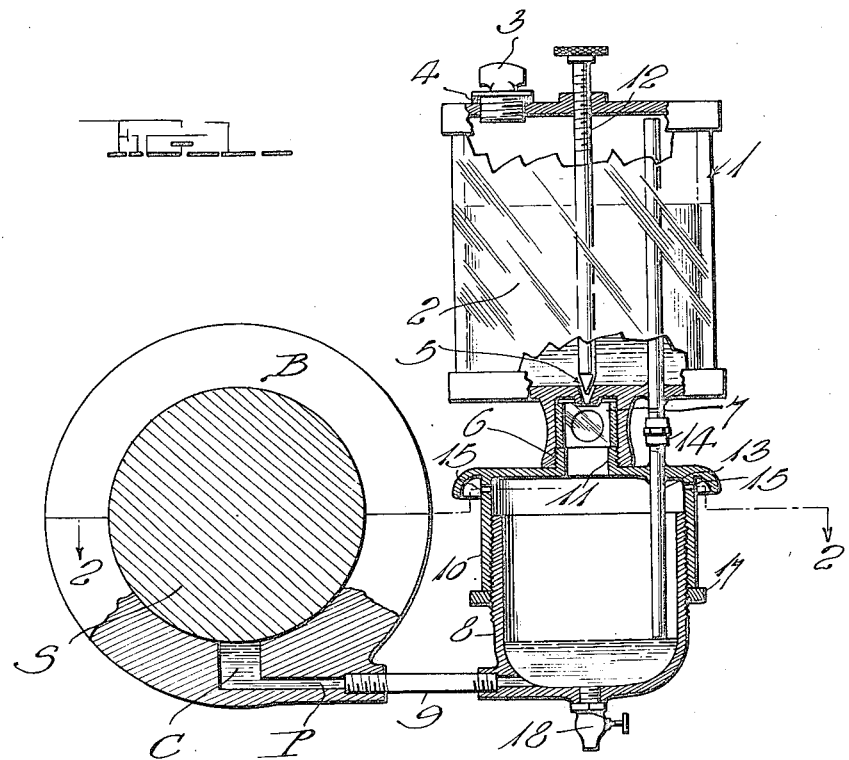
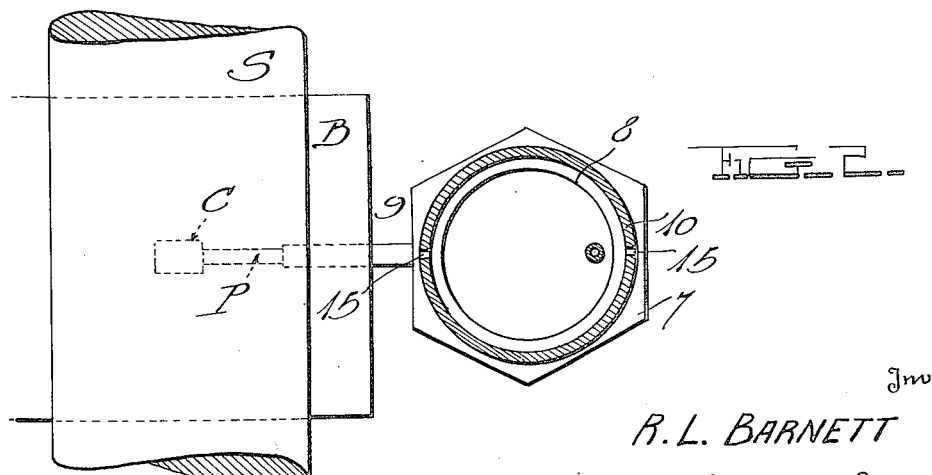
Inventor
R. L. BARNETT
Attorneys

UNITED STATES PATENT OFFICE.

RALPH LINN BARNETT, OF LANGELOTH, PENNSYLVANIA.

LUBRICATING DEVICE.

1,424,974. Specification of Letters Patent. Patented Aug. 8, 1922.

Application filed September 16, 1920. Serial No. 410,635.

*To all whom it may concern:*

Be it known that I, RALPH LINN BARNETT, a citizen of the United States, residing at Langeloth, in the county of Washington and State of Pennsylvania, have invented certain new and useful Improvements in Lubricating Devices; and I do declare the following to be a full, clear, and exact description of the invention, such as will enable others skilled in the art to which it appertains to make and use the same.

This invention relates to an improved lubricating device which is especially, although not necessarily, designed for oiling bearings and shafts; it being of such construction that it will prevent the very common waste of oil due to the fact that it insures that the bearing or shaft shall receive exactly the amount of lubricant actually consumed, thus keeping the shaft properly lubricated at all times.

Another object of the invention is to provide a lubricating device which is entirely automatic in operation, the same requiring no attention whatsoever after having once been adjusted and regulated.

A further and important object of the invention is to provide a lubricating device embodying a reservoir and receiving cup in communication with one another and air controlled vacuum release means communicating with the reservoir and cup, this vacuum release means being adjustable so as to permit the oil level in the cup to be raised or lowered to insure proper lubrication of the shaft or bearing to prevent the shaft from throwing oil, to prevent dripping of oil from the bearing, and to prevent the bearing from running warm.

A still further object of the invention is to provide a lubricating device which is constructed from comparatively few simple and inexpensive parts which are so connected and arranged that the device may be easily and readily cleaned and repaired due to the ease of disassembling the parts thereof; one which embodies a reservoir including a transparent portion to permit the contents to be viewed from the exterior; and one which includes means for locking the vacuum release means in various adjusted position.

Other objects and advantages of the invention will be apparent during the course of the following description.

In the accompanying drawings forming a part of this specification and in which like numerals are employed to designate like parts throughout the same:

Figure 1 is a view partly in section, and partly in elevation, of a lubricating device constructed in accordance with my invention, the same being shown in the manner in which it co-operates with a bearing and a shaft.

Figure 2 is a sectional view taken on the plane of the line 2—2 of Fig. 1, looking in the direction of the arrows.

As before indicated, my lubricating device is especially, although not necessarily, designed for use in connection with shafts and bearings, and for this reason, I have shown it in the manner in which it is associated with these parts. Referring to the drawing by numerals, it will be seen that the latter S designates a shaft of any machinery which is rotatable in a two-part bearing B in the form of a ring oiler, which as usual, includes an oil receiving chamber C and a feed passage P for this chamber.

The foregoing parts are old and well-known and form no part of my invention. My invention resides in the improved lubricating device which is associated with said parts. In carrying out my invention, I employ a reservoir 1 of suitable shape and design, the same including a transparent portion 2 by means of which the contents thereof may be viewed from the exterior, and a suitable filling opening at its top which is closed by means of a screw-plug 3. To insure against leakage, the filling plug 3 will be provided with a suitable gasket 4. In addition to the foregoing parts, the reservoir also includes a valve seat 5 and a depending internally screw-threaded passage 6. Arranged in the passage 6 and held therein in any suitable manner is a glass sleeve 7 which covers an aperture formed in the sleeve 6, this sleeve permitting the oil passing from the reservoir into the receiving cup to be viewed from the exterior. The lubricant, as before intimated, passes from the reservoir 1 into a chamber which may be well termed the receiving cup 8. This receiving cup is provided with external screw-threads adjacent its open top and is provided at its bottom with a discharge pipe 9 which is connected to the feed passage of the bearing B. A screw-cap 10 is engaged with the screw-threads of said receiving cup and this screw-cap is provided with a centrally disposed screw-threaded tubular part 11 which is screwed into the passage 6 to open up communication between the reservoir and the feeding cup. A fluid regulating valve 12 in the form of a needle-valve may be employed if desired, the same being here shown as carried by the reservoir and being arranged to coact with said valve seat 5 so that the amount of oil passing from the reservoir into the receiving cup may be regulated as desired. I wish to state at this point that the receiving cup normally contains a predetermined amount of lubricant and this lubricant passes through the pipe 9 and passage P into the chamber C so that the shaft S will collect oil from the chamber C and will thus be properly lubricated. It is to be noted that the level of the oil in the receiving cup 8 is approximately on a horizontal line with the level of the oil in the chamber C so as to insure that the last named chamber will contain sufficient oil to permit the shaft S to collect it from said chamber.

I employ novel means for replenishing the oil in the receiving cup 8 when it has receded below a predetermined level. This means is controlled by air and releases the vacuum in the reservoir, permitting oil to flow from the latter into the receiving cup to bring the level of oil in the latter up to the desired level. The means referred to is in the form of a pipe 13 which is secured to said screw-cap 10 and extends upwardly through the bottom of the reservoir into the interior of the latter and downwardly into the receiving cup 8 in the manner shown. This pipe 13 may be made in two sections and secured together by a suitable coupling 14 and will be secured to the screw-cap 10 and reservoir 1 in any suitable way. By making it in two sections, the disassembling of the device for cleaning and repairing will be facilitated. Air is supplied to the pipes 13 through small perforations 15 formed in the screw-cap, these perforations being partially covered by a down-turned flange 16 which serves as a guard flange and prevents, to a great extent, entrance of dirt and dust and other extraneous matter to the receiving cup 8. For the purpose of retaining the screw-cap 10 in various adjusted positions, I desire to employ a lock-nut 17 which will be screwed on the receiving cup below the lower edge of the screw-cap 10 in the manner clearly shown. With this nut, it will be seen that when the vacuum release pipe 13 has been adjusted to operate at a certain point, it may be retained in this position by means of the lock-nut 17. If desirable, a drain cock 18 will be employed for the purpose of removing oil from the receiving cup 8.

The operation of the device is as follows:

The reservoir 1 is filled with a quantity of lubricant through the inlet opening which is closed by the screw-cap 3. Inasmuch as the greater portion of the reservoir is of glass or other transparent material, the amount of lubricant contained therein may be quickly viewed from the exterior so as to prevent overfilling and to permit a slight space to be formed between the level of the oil and the top of the reservoir which may be well termed the vacuum air space. While the reservoir is being filled, the needle-valve 12 is screwed down against its seat 5 to close the outlet of the reservoir. Having obtained the proper amount of lubricant in the reservoir, the valve 12 is opened and the oil is then permitted to pass through the outlet in the reservoir into the receiving chamber 8, through the pipe 9 and thence into the chamber C of the ring oiler or bearing B. The oil in the receiving cup will raise until it comes into contact with the lower end of the lower vacuum release pipe 13. Then air will be prevented from passing through the opening 15 and upwardly through the pipes 13. Consequently a vacuum will be obtained in the reservoir and further flowing of the oil from the latter will be checked, as is obvious. Now, as the shaft rotates and collects oil from the chamber C, the oil in this chamber and in the receiving cup will in time be used and naturally the oil in the receiving cup will recede and permit a space to be formed between its level and the lower end of the vacuum release pipe. Then, air will pass through the openings 15 into the cup 8 and upwardly through the pipe 13, will release the vacuum formed in the reservoir and oil will then begin to flow from the latter into the receiving cup until the oil in this receiving cup resumes its normal level which is determined by adjusting the vacuum feed pipe by means of the screw-threaded cap 10. When the cap 10 is in the desired adjusted position, it may be retained in this position by the lock nut 17 as before stated. Should the revolving shaft S throw oil, or if, on stopping the machinery, the oil carried by the shaft which is then returning to the reservoir, should cause oil to drip from the inner end of the bearing B, the cap 10 should be screwed down a little in order to lower the oil level in the receiving cup 8. This lowering of the oil level will not take place immediately but its level will change after some of the oil has been used when the shaft is again set into rotation. Furthermore, should the bearing or shaft run warm as is the natural tendency, it is advisable to change the level of the oil so that it will be at a point as high as possible.

From the foregoing description, it will be seen that I have devised an extremely advantageous and effective lubricating device for shafts, bearings and the like which, due to its novel construction and arrangement, permits the oil level in the oil receiving chamber to be varied to prevent the shaft from throwing oil, to prevent oil from dripping from the bearing or box, and to overcome the tendency of the bearing or shaft from running warm. Furthermore, because of this change of the oil level, my device may be effectively used to supply oil to various elevations. Another novel feature to be considered is the fact that the reservoir includes a transparent portion which permits the contents of the latter to be viewed from the exterior so as to determine when to refill this reservoir. Also, the employment of the tubular glass part in the passage between the reservoir and receiving cup enables the user to determine whether or not the oil is feeding properly through the reservoir outlet and into the receiving cup. In other words, this construction provides a novel sight opening. Still another feature of construction not to be overlooked is the general arrangement and connection of the various parts of the device which is such that it permits these parts to be readily disconnected for cleaning and assembling. These and other advantages and features of my device, have no doubt, become apparent from the foregoing description.

A very careful consideration of the foregoing description taken in connection with the accompanying drawing will enable persons skilled in the art to which this invention relates, to obtain a clear understanding of the same. For this reason, a more lengthy description is deemed unnecessary.

While I have shown and described my improved lubricating device as being especially designed for use in connection with oiling bearings and shafts, I wish it to be understood that it may be equally well used to supply a lubricant to various other machine elements.

Since probably the best results may be obtained with the construction and arrangement of parts disclosed, this is taken as the preferred embodiment of my invention. However, I wish it to be understood that various minor changes in the shape, size, and arrangement of parts may be resorted to without departing from the spirit of the invention or the scope of the subjoined claims.

I claim:

1. A device of the class described comprising a reservoir, a receiving cup, open at its top and provided at its bottom with discharge means, an adjustable closure for said cup, an independent and separate conduit opening up communication between the reservoir and cup, and a vacuum-release-pipe for the reservoir carried by the aforesaid closure.

2. A lubricating device comprising a reservoir including a transparent portion, a valve seat, and a depending neck below the valve seat; a valve in said reservoir coacting with the seat; a screw-threaded receiving cup, open at its top and provided with discharge means near its bottom, a screw-threaded closure for the open end of said cup having an opening in communication with the depending neck, and being provided with an air inlet opening; and a vacuum-release-pipe carried by said closure, the same communicating with the cup and reservoir.

3. A lubricating device of the class described comprising a transparent reservoir having a valve seat at the center of its bottom, and a depending internally screw-threaded neck directly beneath said valve seat, said neck being formed with a sight-opening, a screw threaded needle valve arranged in said reservoir and co-operative with said seat, a receiving cup disposed beneath said reservoir, being provided at its bottom with an outlet and being open at its top and provided with external screw threads, a closure for the open end of said cup having screw threads engaged with the threads on the latter, being formed with air intake openings and with a depending guard flange co-operative with said openings, said closure being open at its center and being equipped with a screw threaded neck engaged with the threads of said first named neck, a vacuum release pipe carried by said closure and extending into said reservoir, and a stop-nut on the threads of said receiving cup for controlling the adjustment of said closure.

In testimony whereof I have hereunto set my hand.

RALPH LINN BARNETT.